(No Model.)
H. HAUPT.
CAR TRUCK.
No. 570,798. Patented Nov. 3, 1896.
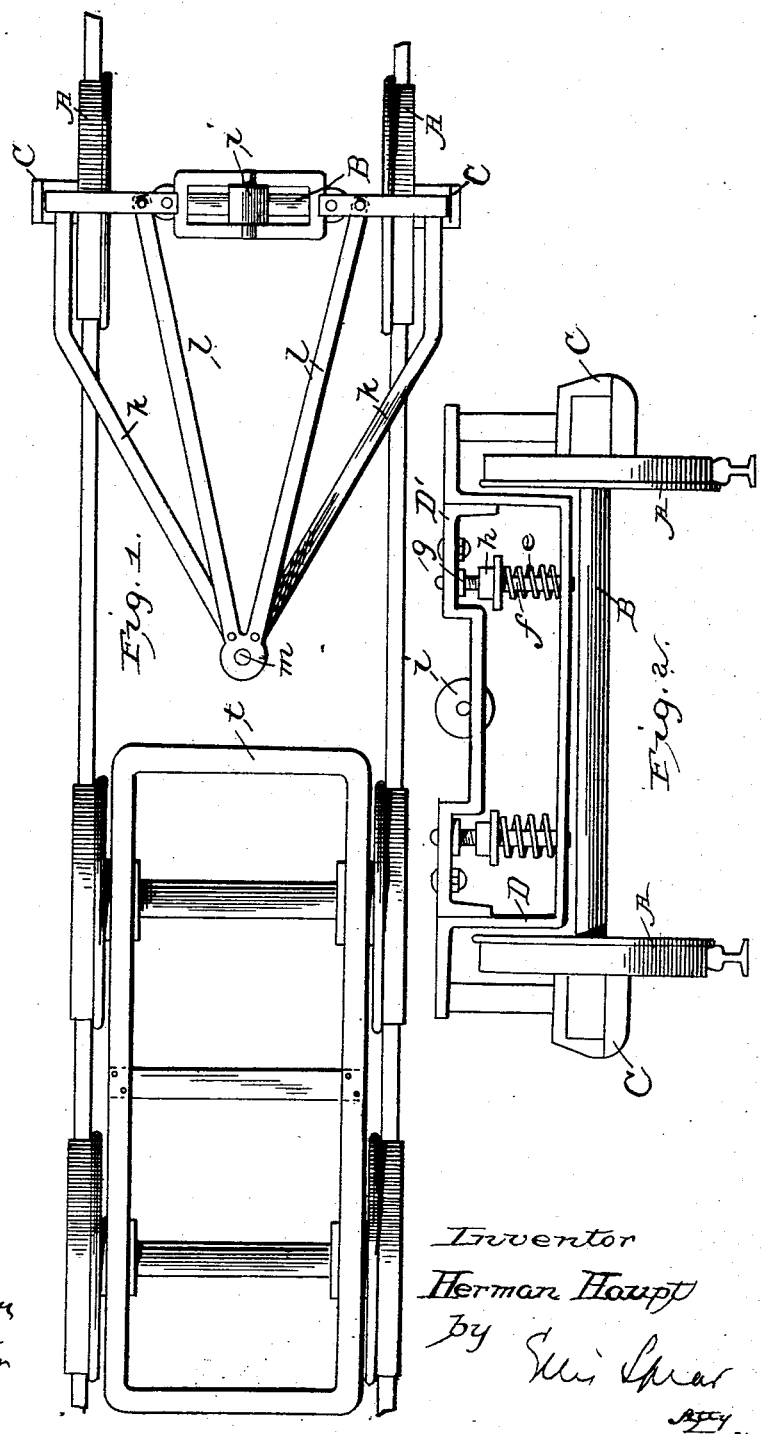
Attest
Walter Donaldson
J. L. Middleton
Inventor
Herman Haupt
by
Ellis Spear
Atty

UNITED STATES PATENT OFFICE.

HERMAN HAUPT, OF WASHINGTON, DISTRICT OF COLUMBIA, ASSIGNOR TO THE GENERAL COMPRESSED AIR COMPANY, OF NEW JERSEY.

CAR-TRUCK.

SPECIFICATION forming part of Letters Patent No. 570,798, dated November 3, 1896.

Application filed January 30, 1896. Serial No. 577,340. (No model.)

*To all whom it may concern:*

Be it known that I, HERMAN HAUPT, a citizen of the United States, residing at Washington, in the District of Columbia, have invented certain new and useful Improvements in Car-Trucks, of which the following is a specification, reference being had therein to the accompanying drawings.

My invention relates to locomotive-trucks. It is more especially designed for that class of locomotives which are used on street and similar railways, but it is not necessarily limited to such motors. In a locomotive where the adhesion of more than one pair of wheels is necessary in overcoming grades or in hauling heavy trains two or more pairs of wheels must be connected by rods, and their axles must consequently maintain a fixed condition of parallelism, which causes great increase of friction upon curves. Power cannot be advantageously applied to trucks pivoted at a central point, and if so applied there must be a duplication of cylinders and other machinery and flexible connections for the transmissions of steam or other motive power.

For a motor-car the best possible application of power is made to a four-wheeled truck, located in the middle of the car, with the longest wheel-base that the curves of the road will permit, the wheels being coupled by connecting-rods and the whole weight of the car being upon the four wheels, so as to secure the maximum adhesion; but if the car exceeds a very moderate length the weight of the overhanging ends, if they be unsupported, will cause unpleasant and even dangerous oscillations; but an ordinary truck at each end pivoted around a central point cannot be employed in connection with a rigid truck in the middle, to which the power is applied, for the reason that the center of these trucks must be kept in line with the axis of the car and cannot, without complicated machinery, be thrown automatically into a radial position upon striking a curve.

I have sought to overcome the difficulties above mentioned, incidental to the use of a four-wheeled truck in the middle of the motor-frame, and having the wheels all connected for driving purposes; and my invention consists of swiveled supporting-wheels, combined with springs interposed between said wheels and the body of the car, said wheels being adapted, by reason of their swivels, to automatically assume a radial position upon striking a curve.

My said invention is illustrated in the accompanying drawings, in which—

Figure 1 shows in plan, the driving-truck in the middle, the supporting-truck at an end of the car. Fig. 2 represents an end view of the supporting-truck.

The truck $t$ is a four-wheeled driving-truck, rigid on the frame, of any well known or suitable construction, and having it wheels connected.

In the form shown in Figs. 1 and 2 the swiveled pair of wheels A A are connected by an axle B in the ordinary manner. Upon bolsters resting on the axle-boxes C C is supported a frame D, one part of which, D', is movable vertically and rests on springs $e\ e$, which in turn rest upon the fixed part of the frame. The springs shown are coiled about connecting-bolts $f$ between the upper and lower parts of the frame. Nuts $g$ and $h$ serve to adjust the relation of the frame parts, and they cause the load to bear more or less heavily upon the track.

The bearing of the main frame of the car or motor is a movable one, and the device shown at $i$ is convenient. This consists of a roller mounted in a slotted plate, and having its ends reduced to form axles, which bear on the sides of the support, which is on the movable part of the frame. The car or motor body is provided with any suitable bearing-plate, which rests directly upon the roller, and as the truck oscillates laterally the roller-bearing shifts easily and without material friction.

The shifting of the wheels is accomplished automatically by means of a pivoted connection to the body. This connection may be conveniently made in the form shown more clearly in Fig. 1. A pair of braces $k\ k$, fixed to the axle-boxes on the outside of the wheels, and another pair $l\ l$, fixed to the movable frame, or frame at interior points, are all connected to a central pivot $m$ on the main frame, so that the truck may oscillate laterally on this pivotal point, the end of the main frame resting and shifting on the roller and the amount of weight on the truck depending upon the adjustment of the movable part of the truck-frame, which bears directly upon the springs. While I have shown but one of these swiveled trucks, it will be understood that one is to be applied at each end.

As to the dimensions or relation of the parts, these may be left to the skill of the builder. As an example, however, if the wheel-base of the middle rigid truck to which the power is applied be seven feet six inches, and the radial axles be placed each six feet from the axles of the motor-truck, the pivot-point of the movable truck must be five feet six inches from the axle of the movable or radial truck to make it assume a radial position on a curve the inside rail of which is of a thirty-seven-foot radius.

I claim—

In combination with the main frame, and central motor-truck, the supporting wheels and axle under the end of the frame, the frame D having its outer ends supported from the axles outside the wheels, said frame D having its portion between the wheels depressed, the supplemental frame guided vertically in said depressed portion, springs interposed between said supplemental frame and frame D, and the rolling contact carried upon said supplemental frame for supporting the end of the main frame.

In testimony whereof I affix my signature in presence of two witnesses.

HERMAN HAUPT.

Witnesses:
DANIEL J. AUGUSTINE,
JAMES McLAIN.